United States Patent [19]
Couture et al.

[11] 3,896,942
[45] July 29, 1975

[54] SILO UNLOADER

[75] Inventors: Gérard Couture, Danville; Gratien Houle, Wickham, both of Canada

[73] Assignee: Wic Inc., Wickham, Canada

[22] Filed: Aug. 22, 1973

[21] Appl. No.: 390,606

[52] U.S. Cl. .............................. 214/17 DB; 198/128
[51] Int. Cl. .............................................. A01f 25/16
[58] Field of Search ........ 214/17 DB, 17 D, 17 DA; 302/56; 198/174, 128 X

[56] References Cited
UNITED STATES PATENTS

| | | | |
|---|---|---|---|
| 504,589 | 9/1893 | Kaime | 198/128 X |
| 2,958,412 | 11/1960 | Buschbom | 198/128 |
| 3,013,674 | 12/1961 | Patz | 214/17 DB |
| 3,175,868 | 3/1965 | Smith | 302/56 |
| 3,190,469 | 6/1965 | Huffman | 214/17 DB |
| 3,589,500 | 6/1971 | Hansen | 198/128 |

Primary Examiner—Robert G. Sheridan
Assistant Examiner—Gary Auton

[57] ABSTRACT

A silo unloader of the endless conveyor chain type having scoops attached to an endless chain, a pair of sprocket wheels supporting the endless conveyor chain and arranged to drive the same to scoop and scrape silage towards an impeller duct and to impel the scooped silage upwardly through the latter and an overlying curved duct arranged to discharge the silage through a side opening in the silo wall. One sprocket wheel is mounted into a silage inlet opening of the impeller and is provided with impeller blades arranged to register side by side with the actually-impelling scoops to increase the impelling action. A traversing bogey is articulately connected adjacent the other sprocket wheel and clutch means is provided to automatically control the rotational traversing of the bogey and the endless conveyor chain inside a silo.

6 Claims, 12 Drawing Figures

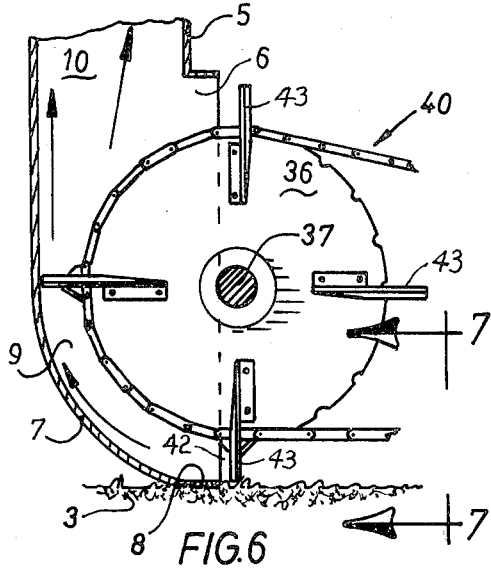
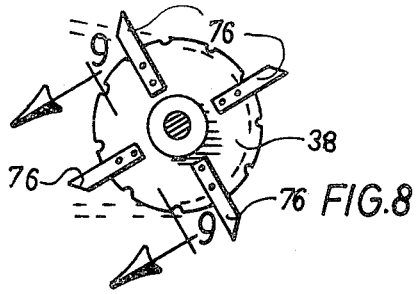
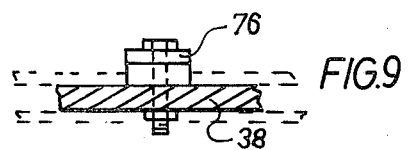
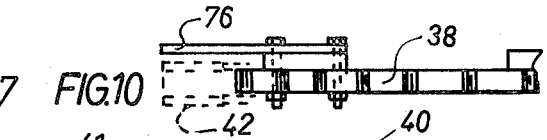
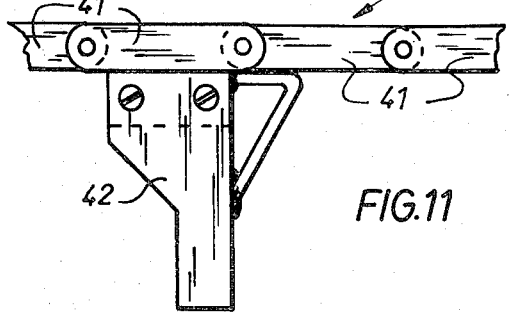
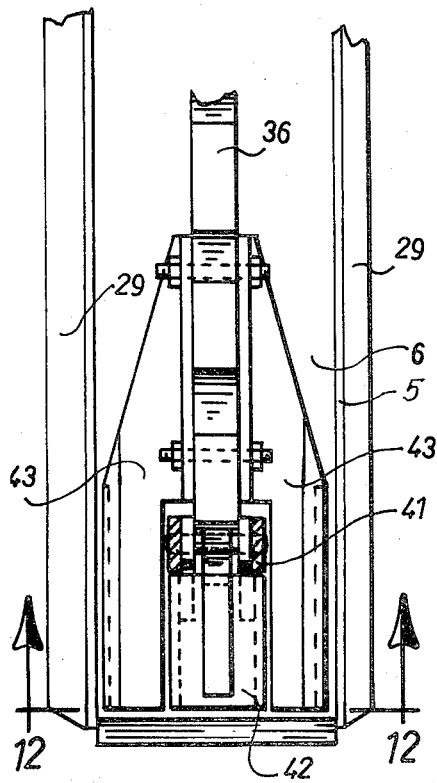
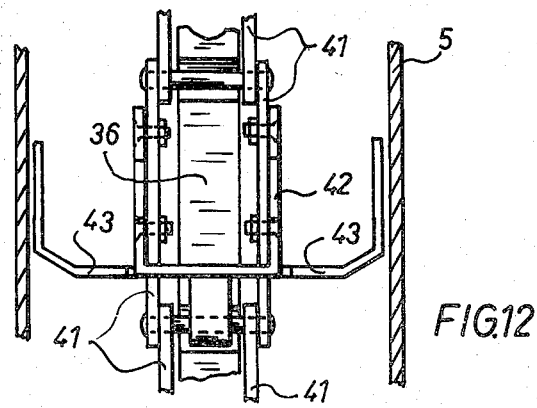

SILO UNLOADER

This invention relates to a silo unloader and, more particularly, to a silo unloader of the endless conveyor and impelling scoop type.

There are provided silo unloaders of the above type wherein the impelling action is produced by scoops fixed to an endless chain and describing an upward circumferential path inside an impeller duct to centrifugally and upwardly impel the scooped silage.

It has been noted that the effectiveness of such silo unloader is relatively low, since the impelling action produced by the scoops is limited by the width of the scoops and of the scooped silage therein. There results a mere throwing action by the scoops.

It is a general object of the invention to provide a silo unloader of the above type which more satisfactorily impels the scooped silage.

It is another general object of the invention to provide a silo unloader of the above type with a traversing endless conveyor chain arranged to circumferentially follow an uneven profile of the silage inside a silo.

It is a further general object of the invention to provide a silo unloader of the above type arranged to automatically control circumferential traversing of the endless conveyor chain inside a silo.

It is a specific object of the invention to provide a silo unloader of the above type which includes impelling blades arranged to register side by side with impelling scoops to increase the impelling action.

It is another specific object of the invention to provide a silo unloader of the above type which is provided with a traversing bogey articulately connected to a remote frame portion supporting an end of the endless conveyor chain.

It is a further specific object of the invention to provide a belt drive and a tensioning pulley to control circumferential traversing of the endless conveyor chain by applying and removing the tension on the belt of the belt drive.

The invention will now be described in detail with reference to a preferred embodiment thereof illustrated, by way of example only, in the accompanying drawings, in which:

FIG. 6 is a cross-sectional view as seen along line 6—6 in FIG. 2;

FIG. 7 is a cross-sectional view as seen along line 7—7 in FIG. 6;

FIG. 8 is a side view of a remote sprocket wheel arranged to cut through frozen silage;

FIG. 9 is a cross-sectional view as seen along line 9—9 in FIG. 8;

FIG. 10 is a top view of the sprocket wheel of FIG. 8 and an associated endless conveyor chain;

FIG. 11 is a side view of a scoop attached to an endless conveyor chain; and

FIG. 12 is a cross-sectional view as seen along line 12—12 in FIG. 7.

Figure 1:
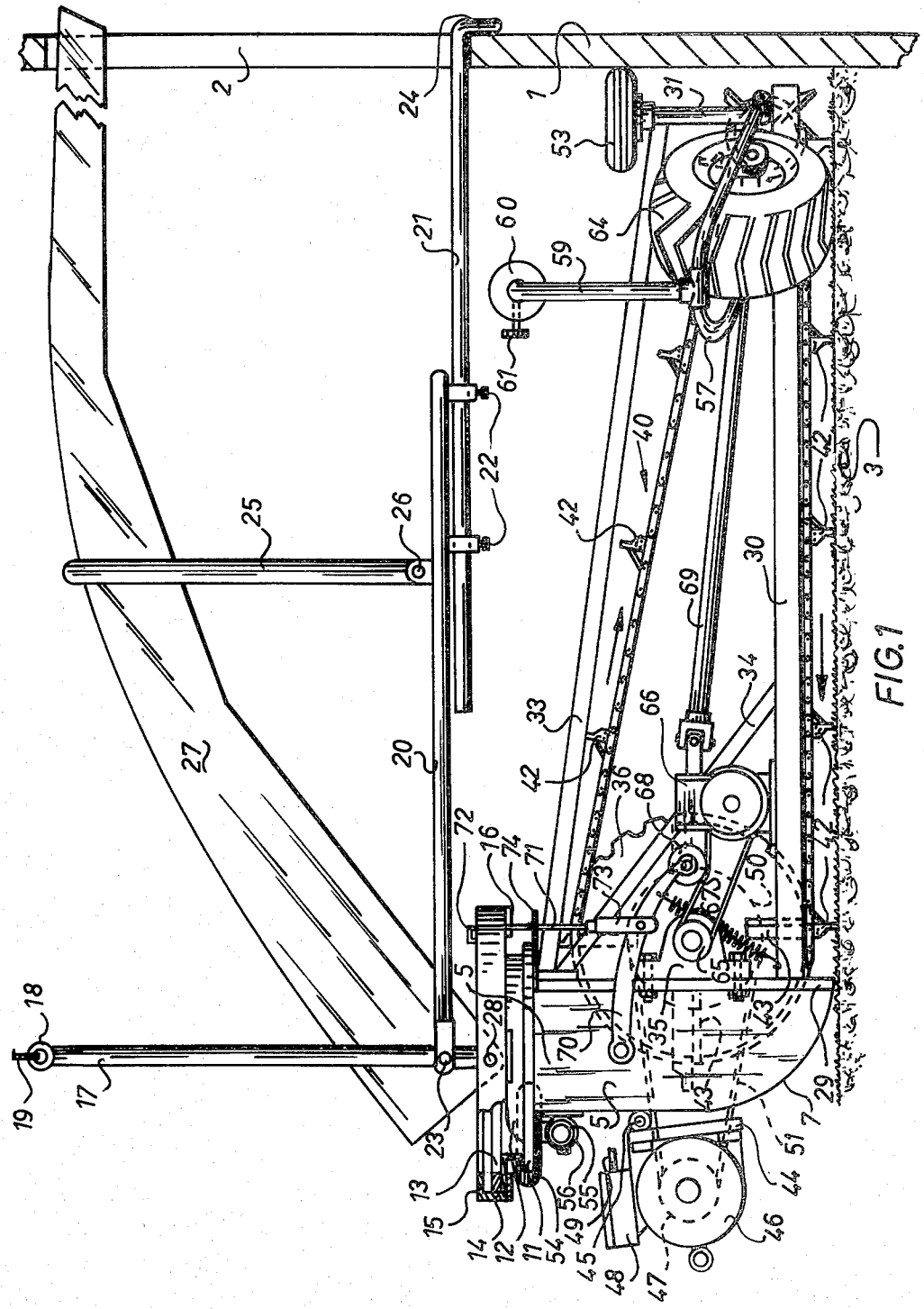
FIG. 1 is a side view of a silo unloader according to the invention mounted in operative position inside a silo.
Figure 2:
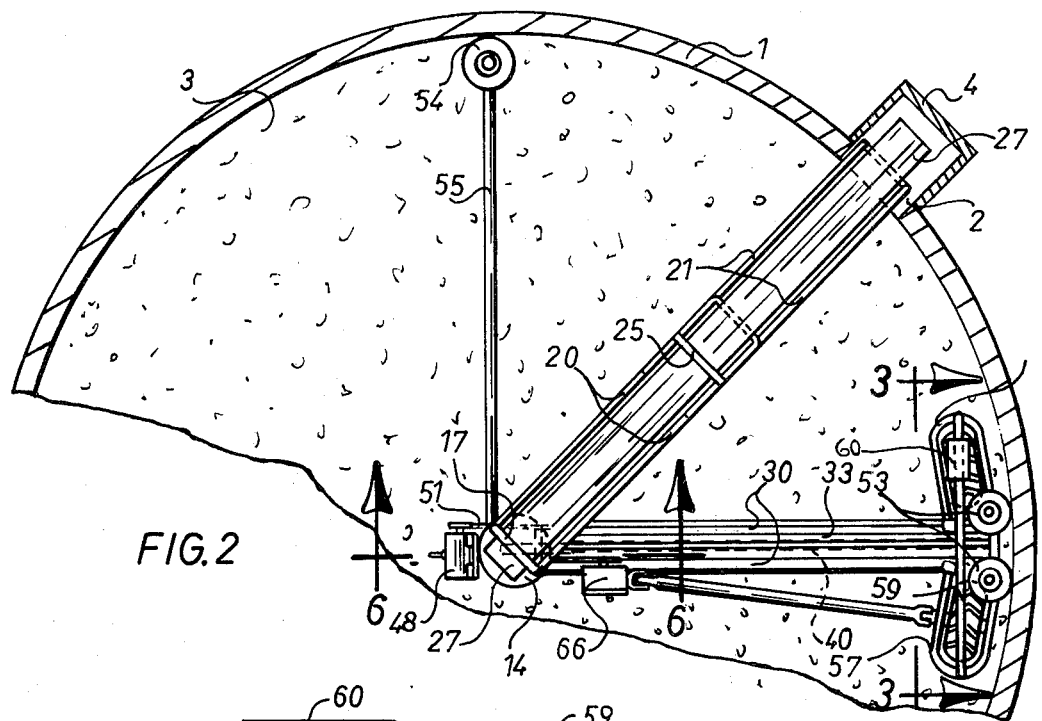
FIG. 2 is a top view of the silo unloader as seen from above in FIG. 1.
Figure 3:
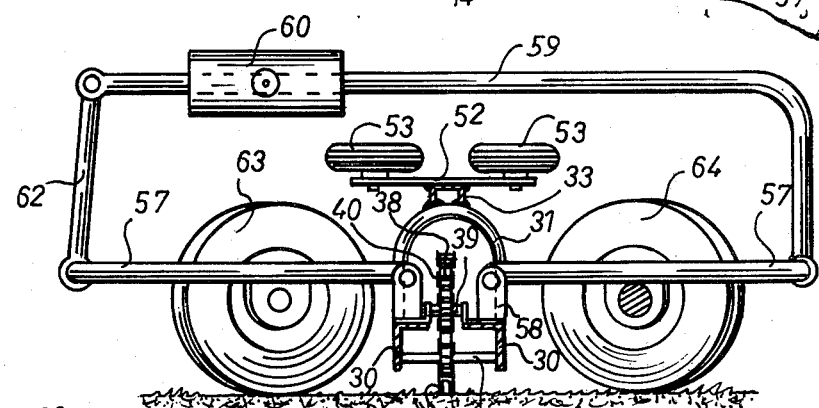
FIG. 3 is a cross-setional view as seen along line 3—3 in FIG. 2.
Figure 4:
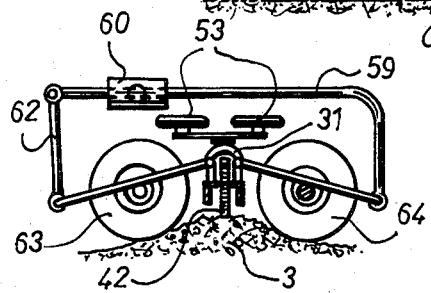
FIGS. 4 and 5 are views corresponding to the view of FIG. 3 but showing the articulated bogey conforming to two different profiles of the silage surface.
Figure 5:
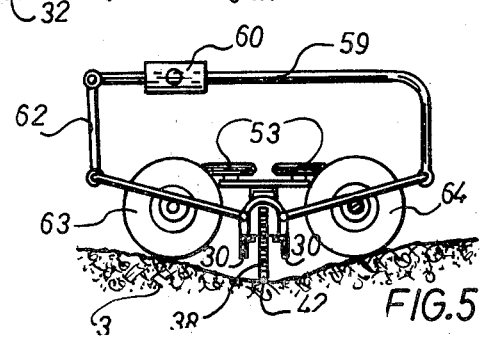

As shown in FIGS. 1 and 2, the silo unloader is arranged to be mounted into a silo having an upright cylindrical side wall 1 provided with a side opening 2 and containing silage 3. A silage chute 4 extends downwardly along the exterior side of the silo wall 1 from the side opening 2.

The illustrated silo unloader according to the invention includes an impeller duct or housing 5 adapted to be mounted in an upright position centrally inside a silo over the silage 3 therein. The impeller duct 5 has a silage inlet opening 6 through the side thereof which extends vertically from the lower portion of the latter. The bottom of the impeller duct 5 has a curved portion 7 extending upwardly from the lower edge 8 of the silage inlet opening 6 to form an upwardly directed circumferential path 9 and an interior silage passage 10 which extends upwardly from the inlet silage opening 6 towards an outlet silage opening, not shown, defined by the open upper end of the impeller duct 5. The latter, as shown in FIG. 1, is formed with an outside annular flange 11, a cylindrical wall 12 and a top outside annular flange 13. A cylindrical ring 14 having an inside annular flange 15 is axially and rotatably mounted around the top outside annular flange 13 coaxially therewith to form a turntable. Tabs 16 are fixed to the lower end of the cylindrical ring 14 to retain the top outside annular flange 13 captive for a purpose to be better understood later.

An inverted U-shape tubular frame member 17 has its ends welded or otherwise fixed onto the inside annular flange 15 and extends upwardly above the latter. A ring 18, eyebolt or the like, is attached to the tubular frame member 17 to suspend the latter and the complete silo unloader by means of a cable 19 suspended centrally inside the silo. An elongated tubular frame comprising members 20 and 21 interconnected by tightening screws 22 is pivoted at 23 on the inverted U-shaped tubular frame member 17 and is provided at its other end with a downwardly bent portion 24 adapted to engage the lower edge of the side opening 2 in the upright silo wall 1 and is arranged to center the impeller duct 5 inside the silo. An upright tubular briddle 25 is pivoted at 26 on the tubular frame member 20 and is arranged to limit the upward swinging of a gooseneck or curved duct 27 about its pivots 28 fixed to the cylindrical ring 14, such that the free end of the curved duct 27 will remain into the side opening 2.

A beam 29 is fixed along each lateral edge of the inlet silage opening 6. Two parallel beams 30 are fixed at one end against the lower end portion of the beams 29 and extends substantially horizontally away therefrom. The ends of the beams 30 which are remote from the impeller duct 5 are provided with a tubular support element 31 of inverted U-shape which is fixed endwise thereon. A transverse piece 32 maintains the remote ends of the beams 30 in spaced-apart relationship. Another beam 33 is fixed at one end to the impeller duct 5 above the inlet silage opening 6 and at its remote other end to the tubular support element 31 to hold the latter in cooperation with the beams 30, in fixed upright relationship relative to the impeller duct 5. A pair of struts 34 are associated to the beams 30 and 33 and the tubular support element 31 to form a substantially rigid frame therewith.

A bracket 35 is attached against one side of each upright lateral beam 29. A first sprocket wheel 36 is fixed to a shaft 37 journalled onto the brackets 35 and rotatably mounts the first sprocket wheel 36 in the inlet silage opening 6. A second sprocket wheel 38 is rotatably mounted by a spindle 39 on the remote ends of the beams 30. An endless conveyor chain 40 passes around the first and second sprockets wheels 36 and 38 and is arranged to rotate with the latter. The chain 40 is made of pairs of parallel chain links 41 which are pivotally connected end to end, as is well known in the art. Scoops 42 of any appropriate shape are attached to longitudinally spaced-apart chain links 41 and extend outwardly of the closed loop defined by the latter to engage the silage under the endless conveyor chain 40. On each side of the first sprocket wheel 36, there are provided a series of radially extending and circumferentially spaced-apart impelling blades 43 which are arranged such that the impelling blades on the opposite sides of the sprocket wheel 36 form transversely alinged pairs. The impelling blades 43 are preferably profiled to produce optimum impelling action. It must be noted that the circumferential spacing between the impelling blades 43 corresponds to the spacing between the scoops 42. Furthermore, the impelling blades 43 must be positioned relative to the scoops 42 such that they will register side by side with each other transversely of the sprocket wheel 36 when travelling upwardly through the afore-mentioned circumferential path 9. Each pair of transversely aligned impelling blades 43 therefore transversely straddle a corresponding scoop 42 to increase the impelling action produced on the scooped silage. The radially outer edges of blades 43 and scoops 42 move close to curved portion 7 of impeller duct 5 and the external lateral flanges of blades 43 move close to the lateral walls of impeller duct 5. Thus, choking of the duct 5 by silage is prevented and efficient impelling is obtained. Also, silage scooped by scoops 42 while travelling in a straight path and which may protrude from the sides of said scoop, freely enters impeller duct 5 as the latter is much wider than said scoops 42.

A mounting bracket 44 is pivoted by a hinge pin 45 against the outside surface of the impeller duct 5. An electric motor 46 having a driving pulley 47 is attached onto the bracket 44. An electric control box 48, electrically fed by a cable 49, is provided on the bracket 44 to control the energization of the electric motor 46. A pulley 50 is fixed to the shaft 37 for rotation therewith and a belt 51 passes around the pulleys 47 and 50 to transmit rotation from the motor 46 to the sprocket wheels 36 and 38 and the endless conveyor chain 40. A spring, not shown, is mounted on the hinge pin 45 in engagement with the impeller duct 5 and the mounting bracket 44 to bias the latter away from the former and to thereby suitably tension the drive belt 51.

A cross piece 52 is fixed, as by welding, onto the remote end of the beam 33 and a pair of centering wheels 53 are rotatably and horizontally mounted on the ends of the cross piece 52 and are arranged to engage the inside surface of the silo wall 1. Another centering wheel 54 is similarly horizontally mounted on the remote end of a supporting arm 55. The other end of the latter is slidably adjustable longitudinally into a sleeve 56 welded against the outside surface of the impeller duct 5. The centering wheels 54 and 55 are arranged to engage the silo wall 1 at the same distance from the central axis of the silo to allow rotation of the endless conveyor chain about the same central axis by suspending the impeller duct 5 thereto.

A traversing bogey and driving assembly therefor will now be described with reference to FIGS. 1 to 5 inclusive. The traversing bogey includes a traversing frame having a pair of U-shaped links 57 articulately joined at their ends by brackets 58 to the remote frame portion on opposite sides of the second sprocket wheel 38 and extends in laterally opposite directions transversely relative to the latter. A tubular elongated member 59 is articulately joined to one of the U-shaped links 57 and extends laterally on both sides relative to the second sprocket wheel 38. A weight 60 is adjustably slidable along the tubular elongated member 59 and is retained in place by a setscrew 61. A further tubular link 62 articulately joins the other U-shaped link 57 to the tubular elongated member 59. Traversing wheels 63 and 64 are rotatably mounted on the U-shaped links 57 intermediate the two legs thereof by spindles which converge horizontally towards the impeller duct 5.

A drive train is connected between the shaft 37 and the spindle of the traversing wheel 64 to transmit rotation thereto and thereby cause circumferential traversing of the second sprocket wheel 38 and the endless conveyor chain. The drive train includes a belt drive forming a clutch means arranged to automatically interrupt the traversing displacement, as will be explained hereinafter. The belt drive comprises a pulley 65 fixed to the shaft 37 for rotation therewith, a pulley, not shown, fixed to a speed reducing gear box 66, a belt 67 cooperatively engaging around the pulleys and a tensioning pulley 68. The drive train further includes a drive shaft 69 connected by universal joints to the output of the gear box 66 and to the spindle of the traversing wheel 64. The belt tensioning pulley 68 is rotatably mounted on the free end of a lever 70, which is pivotally connected at its other end on the outside of the impeller duct 5. An actuator 71 has a curved end 72 engaging the top surface of the turntable ring 14 and a forked end 73 pivoted to the lever arm 70 intermediate the ends thereof. A guide 74 is fixed to the impeller duct 5 and engages the actuator 71 to hold the same in vertically slidable position. A spring 75 is connected to the lever arm 70 to bias the belt tensioning pulley into tensioning position.

FIGS. 8, 9, and 10 illustrate a second sprocket wheel 38 which is provided with cutting blades 76 on one side thereof to cut frozen silage and allow operation of the silo unloader when the silage is frozen inside the silo.

The silo unloader is lowered by the cable 19 into resting position on the silage in a silo with the duct in central position, the centering wheels 53 and 54 engaging the silo wall 1 and the curved duct 27 extending into the side opening 2. The outside flange 13 is then in elevated position inside the ring 14 and the actuator 71 is in its lowermost position allowing the spring 75 to cause the belt tensioning pulley 68 to engage and tension the belt. If the motor 46 is then energized, both the endless conveyor chain 40 and the traversing wheel 64 are positively driven, causing scooping, scraping and impelling with simultaneous circumferential traversing of the endless conveyor chain inside the silo about the central axis thereof.

When the level of silage has been substantially lowered or when the cable 19 is pulled upwardly, the ring 14 is moved axially upwardly relative to the annular flange 13, causing the actuator 71 to move upwardly relative to the impeller duct 5 and to remove the tension in the belt 67. There results that the rotation of the belt drive, the shaft 69 and the traversing wheels 63 and 64 is interrupted and the circumferential traversing is stopped The traversing bogey is articulately joined to the remote frame portion to allow the remote end of the endless conveyor chain to easily move up and down the circmferential profile and such as to cause the scoops to gradually level such uneven profile. The adjustable weight 60 is provided to adjust the relative loading on the traversing wheels 63 and 64.

What we claim is:

1. A silo unloader for use in a silo having an upright silo wall with a side opening therein, comprising in combination an impeller duct means having a silage inlet, a silage outlet and an interior silage passage extending from said silage inlet to said silage outlet, frame means fixed to said impeller duct means and extending away therefrom, a first rotary member mounted adjacent said silage inlet, a second rotary member mounted onto said frame means on an axis parallel to the axis of said first rotary member and spaced laterally therefrom, endless conveyor means engaging around said first and second rotary members and arranged to rotate therewith, a series of scoops attached to said endless conveyor means in spaced-apart relationship relative to each other and forming part of said endless conveyor means and constructed and arranged to scoop and scrape silage towards said silage inlet and to describe a circumferential path around the axis of said first rotary member and to impel the scooped silage in said interior silage passage towards said silage outlet, drive means connected to one of said rotary members and arranged to rotate the latter and said endless conveyor means, impelling blades operatively connected to said first rotary member for bodily rotation therewith in circumferentially spaced-apart relationship corresponding to the spaced relationship of said scoops, and in side-by-side registry with the latter when travelling along said circumferential path, whereby to increase the impelling action on the scooped silage, said frame means further comprising a remote frame portion relative to said impeller duct means, said second rotary member is rotatably mounted onto said remote frame portion and a traversing bogey frame is articulately attached to said remote frame portion and is arranged to traverse the latter and said endless conveyor means over the silage in the silo, wherein said blades are fixed against the opposite sides of said first rotary member and extend radially therefrom in transversely aligned pairs arranged to register and to straddle the scoops which are actually travelling along said circumferential path, and wherein said first and second rotary members are a first and a second sprocket wheel respectively, said impeller duct means is constructed and arranged to be used in upright position and defines an upright side wall, said silage inlet is a silage inlet opening extending through the bottom portion of said side wall, said first sprocket wheel is rotatably mounted into said silage inlet opening, said silage outlet is a silage outlet opening provided above said silage inlet opening, said circumferential path extends upwardly into said interior silage passage from said silage inlet opening towards said silage outlet opening, said endless conveyor means includes an endless chain, and the latter and said sprocket wheels are rotatably mounted in an upright plane intersecting said impeller duct means.

2. A silo unloader as defined in claim 1, wherein said traversing bogey frame includes a pair of elongated links articulately joined at one end to said remote frame portion on opposite sides of said second sprocket wheel and extending in laterally opposite directions relative to the latter, a traversing wheel rotatably mounted on each side of said second sprocket wheel on the corresponding elongated link about spindle axes substantially converging horizontally towards said impeller duct means and a frame structure articulately joining the other ends of said elongated links.

3. A silo unloader as defined in claim 2, wherein said frame structure includes an elongated member extending laterally on both sides relative to said second sprocket wheel and a weight is adjustably displaceable along said elongated member, whereby to vary the relative loading on said traversing wheels.

4. A silo unloader as defined in claim 3, further including centering wheels horizontally mounted on said frame members and arranged to engage said upright silo wall at the same radial spacing from the central axis of said silo passing through said impeller duct means, an open-ended curved duct constructed and arranged to extend from said silage outlet opening to said side opening to unload the scooped and impelled silage outwardly through the latter, and a turntable connecting said curved duct to said impeller duct means and arranged for relative rotation of one relative to the other.

5. A silo unloader as defined as claim 4, wherein said turntable is mounted on top of said impeller duct means and is arranged for rotational and axial displacement relative to the latter and to said central axis, a suspending member is attached onto said turntable and arranged to suspend the latter against axial displacement along said central axis, a drive train is connected to one of said traversing wheels to rotate the same, and a clutch means is mounted into said drive train, is connected to said turntable and to said impeller duct means, and is arranged to respond to the axial displacement of the latter relative to said turntable to operate said clutch means and to interrupt the rotation of said one traversing wheel and circumferential traversing of said bogey frame and endless conveyor chain over the silage in the silo.

6. A silo unloader as defined in claim 5, wherein said clutch means includes a belt drive, a belt, a lever pivotally mounted onto the outside of said impeller duct means, a tensioning pulley rotatably mounted on a free end of said lever and arranged to engage the belt of said belt drive and to selectively apply or remove tension thereon and an actuator connected to said lever and to said turntable and arranged to displace said tensioning pulley away from said belt and to remove tension thereon upon axial displacement of said impeller duct means away from said turntable.

* * * * *